United States Patent

Wurr

Patent Number: 5,852,941

Date of Patent: Dec. 29, 1998

[54] METHOD OF PRODUCING A STARTING MATERIAL FOR PRODUCING BIOLOGICALLY DEGRADABLE SACKS AND BAGS

[75] Inventor: Egon Wurr, Rheine, Germany

[73] Assignee: Natura Verpackungs GmbH, Salzbergen, Germany

[21] Appl. No.: 750,582

[22] Filed: Mar. 26, 1997

[87] PCT Pub. No.: WO96/32240

PCT Pub. Date: Oct. 17, 1996

[30] Foreign Application Priority Data

Apr. 12, 1995 [DE] Germany .................. 195 13 808.2

[51] Int. Cl.[6] .................................. D04B 39/00
[52] U.S. Cl. ................. 66/170; 66/202; 28/166
[58] Field of Search ................. 28/100, 165, 166, 28/167, 169, 140; 66/169 R, 170, 202; 139/420 R, 383 R, 389; 428/411.1, 532

[56] References Cited

U.S. PATENT DOCUMENTS

| 3,709,263 | 1/1973 | Jackson et al. .................. 139/420 R |
|---|---|---|
| 5,106,890 | 4/1992 | Maruhashi et al. .................. 428/424.6 |
| 5,196,247 | 3/1993 | Wu et al. .................. 428/286 |
| 5,294,469 | 3/1994 | Suzuki et al. .................. 139/420 R |
| 5,397,612 | 3/1995 | Small et al. .................. 66/202 |
| 5,415,827 | 5/1995 | Tomka .................. 428/516 |
| 5,486,214 | 1/1996 | Pasczynski et al. .................. 8/524 |

*Primary Examiner*—William Stryjewski
*Assistant Examiner*—Larry D. Worrell, Jr.
*Attorney, Agent, or Firm*—Cushman Darby & Cushman IP Group of Pillsbury Madison & Sutro, LLP

[57] ABSTRACT

A method for preparing high-strength biodegradable woven or knit webs or mesh hose from biodegradable foil material is provided. The method utilizes a biodegradable foil material made of a modified starch and having a softening point between 60° C. and 80° C. and a thickness of between 10 $\mu$m and 350 $\mu$m. The method includes the steps of subjecting the foil material to a relative humidity between 45% and 65%, slitting the foil material into small foil strips, stretching the small foil strips while heating the strips to between 30° C. to 70° C., and stretching at a stretching ratio between 1:3 to 1:10, at a relative humidity of between 45% and 65%. The stretched small foil strips are cooled to room temperature, and processed into a woven or knit web or mesh hose.

8 Claims, No Drawings

METHOD OF PRODUCING A STARTING MATERIAL FOR PRODUCING BIOLOGICALLY DEGRADABLE SACKS AND BAGS

This application is the national phase of international application PCT/EP96/01550 filed Apr. 11, 1996 which designated the U.S.

BACKGROUND OF THE INVENTION

1. Field of the Invention

The invention relates to a method for producing woven or knit webs or mesh hoses, in particular double-knit webs or mesh hoses, from which biodegradable, in particular decomposable (compostable), high-strength sacks and bags are to be made.

2. Background Information

Various methods for producing biodegradable foils made of raw vegetable materials are known. In this respect reference is made to DE-C-4 228 016, which also refers to numerous other references.

Foils of this type are easily suitable for producing bags, carrier bags, and the like; however, it has been found that such bags in the closed form are not suitable for packaging bags for many products, since they encourage decomposition processes. Perforating such bags also does not bring any significant improvement and reduces tensile strength to such a degree, that they can also not be used.

There is a particular demand for packaging potatoes, onions or other agricultural products. The custom here is to package them in mesh or bags, but not in foil bags. Mesh and bags are considered to be more product-relevant, in particular with fresh and/or moist goods.

A mesh strip for enclosing bodies pressed from straw material is known from DE-A-4 130 508. The mesh strip is made of double-knit small foil strips. The small strips are cut from a foil made of a plastic material. An additive, which undergoes a change under long-term light effects or under the effects of air and/or humidity, is added to the plastic material. A starch preparation which can be plasticized is added to the web strip for forming the web.

Cutting and stretching of small polyolefin flat foil strips is described in DE-Z-kettenwirk-praxis [practical warp-knitting] 3/76, pp. 15 to 18. An unstretched foil of a maximum width of 600 mm and a thickness of 50 to 100 μm is cut into strips in one process step, is mono-axially stretched and wound up. Stretching takes place at a ratio of 1:4 to 1:10. A setting of 1:6, for example, results in an elongation value of 30% to 35%.

Cutting and stretching of small flat polyolefin strips cannot be transferred to plasticized starch preparations for producing mesh strips, because starch is a brittle material to use, which causes processing problems the higher its proportion in the entire volume is.

SUMMARY OF THE INVENTION

It is therefore the object of the invention to recite a method, by means of which it is possible to produce a high-strength sack or bag or a high-strength mesh from a foil-like basic material, known per se, which is produced on the basis of modified starch, along with the employment of weaving and knitting techniques, known per se. It should be possible to ventilate the product and it should be suitable for transporting, storing and selling potatoes, onions and other field vegetables, but still be biodegradable in accordance with the properties of the basic foil material.

DESCRIPTION OF THE INVENTION

This object is attained by a method for producing mesh hoses, woven or knit webs, in particular double-knit webs or mesh hoses, from which biodegradable, in particular decomposable high-strength sacks and bags are to be made, wherein the basic material has a thickness of between 10 μm and 350 μm, which is produced on the basis of modified starch and has a softening point between 60° and 80° C., in accordance with the following process steps:

A) Slitting the foil into small foil strips which can be woven or knitted, preferably into strips of 1 to 10 mm width, B) Pre-stretching and stretching the small foil strips while heating them simultaneously or at a later time to a temperature between 30° C. to 70° C., preferably in the range of 35°±3° C. at a stretching ratio between 1:3 to 1:10. preferably in the range between 1:4.5 to 1:6.5, C) Letting them cool to room temperature, D) Processing of small foil strips of suitable titer and suitable width into a woven or knit web or a mesh hose, E) Enrichment of the foil to a moisture content of 2 weight-% to 25 weight-% in the foil at least in process step A), and of the small foil strips at least in process step B).

DESCRIPTION OF THE INVENTION

The advantages achieved by means of the invention reside in particular in that, because of the enrichment to a moisture content of 2 weight-% to 25 weight-%, the foil produced on the basis of a modified starch can be processed like a plastic foil. Modified starch is a dry or brittle basic material which is hard to work. The enrichment to a moisture content of 2 weights-% to 25 weights-% makes it possible to cut the foil on the basis of modified starch like a plastic foil and to stretch it like a plastic foil. A longitudinal orientation of the molecular chains occurs because of the stretching process, which results in great firmness of the mono-axially stretched strips. This result is known in connection with polyolefins. However, it cannot be considered to be obvious that foils made of starch bring the same or comparable results.

The moisture content of the foil can already be enriched to 2 weights-% to 25 weight-% prior to the process step, at the earliest when it is produced. Because of the even moisture content, starting with its production, the intermediate storage up to the processing of the foil, its even quality is assured. Drying and breaking of the foil is prevented by this. On the other hand, it is assured that the foil used can be immediately processed.

It is advantageous that the moisture content of the small strips is enriched to 2 weight-% to 25 weight-% following their stretching in process step B), at least in process step D). Easy processing of the small strips is assured by maintaining and further keeping this moisture content. The material keeps its elasticity and can be stretched in the appropriate ratio. Enriching the small strips also during the cooling phase, and further processing of the small foil strips can be performed with the same moisture content.

To make the processing of the small foil strips easier, they are revived by means of a biodegradable oil prior to the process step D).

For enriching the moisture content to 2 weight-% to 25 weights-%, the foil and the small foil strips are subjected to a relative humidity between 45% and 65%, particularly between 50 % and 60%, and an ambient temperature between +10° C. and +35° C. In particular during its production, the foil should not be subjected to a temperature which is higher than +35° C.

For pre-treatment, prior to step A) the foil can be subjected for 1 to 48 hours, particularly 20 to 30 hours, to the relative humidity between 45% and 65%, particularly between 50% and 60%, and the ambient temperature between +10° C. and +35° C. Such directed pre-treatment prior to cutting the foil is always performed if it is not absolutely certain whether the foil has the required moisture content. However, it is capable of absorbing the required moisture content within the time mentioned and under the conditions mentioned. The foil as well as the small strips made from it absorb moisture up to a defined degree of saturation. Amounts of moisture exceeding this are not absorbed even during an extended resident time and at the moisture and temperature mentioned. Therefore these scale values for enriching the moisture content of the foil and in the web during the production, storage and processing steps are important.

However, enrichment to 2 weights to 25 weight-% can also be performed in that during the manufacturing process the foil is treated in a water bath for 0.1 to 10 minutes. The foil is capable during the short period of time to absorb moisture up to the saturation point possible for it. In addition, treatment in the water bath has a cooling effect at the end of the manufacturing process.

The foil can be made of at least 10 weight-% to 90 weight-%, in particular 50 weight-%, of modified starch and 10 weight-% to 90 weight-%, in particular 50 weights-%, of a biodegradable plastic, in particular a polylactone (PCL), polyesteramide, copolyester and/or poly-lactic acid. The thickness of the foil should fluctuate over its web between −5% and +10%. Deviations beyond that can have negative effects during the stretching process.

A foil produced with a modified starch in accordance with DE-C-4 228 016 is particularly suitable for the method and is offered under the product name "BIOFLEX BF 102". This product is offered by Biotec Biologische Naturverpackungen GmbH & Co., Emmerich.

It is particularly essential that so-called hose-mesh and/or double-knit sacks can be made of one foil web.

The double-knit sacks produced in this way, which can possibly also be made of a dyed foil material, can be integrated into a disposal system in which initially the agricultural products, such as potatoes or onions, are delivered to the final consumer. The accumulating compostable kitchen waste can then be stored in the emptied bags or sacks and converted in appropriate composting installations into biodegraded compost. This results in a useful technical effect, which aids the acceptance and introduction of the product in a special way. As long as the agricultural products are not stored above a defined temperature and length of time, the double-knit sacks are absolutely stable and do not decompose. Only if a certain milieu, defined by moisture, temperature and micro-bacterial environment, is added, do the sacks decompose rapidly into a composted mass.

Small strip weaving machines or small strip double-knitting machines can be used for producing the woven and knitted webs, such as are known for producing woven and knit strips from polyethylene strips, since the stretched small strip material comes close in its properties to known small polyethylene strips.

The invention will be explained by means of a few examples:

EXAMPLE 1

Commercially available foil of the type BIOFLEX BF 102 of a foil thickness of 80 $\mu$m is cut in a known manner into strips of 2.5 mm width. The strips are pre-heated, pre-stretched, then heated to 35° C. and stretched at a ratio of 1:5.5. A cooling process follows. A yarn sheet of parallel stretched small strips is made from the foil, which enter a double-knit machine.

Prior to stretching, the work room at room temperature (+18° to +24° C.) was brought to a relative humidity of 55%, which was also maintained during processing. The yarn sheet is subsequently processed in a continuing operation under the same climatic conditions into double-web goods on a known double-knit machine and, depending on the size, is suitable for filling with, for example, potatoes or onions in amounts of 1.5, 2.5, but also 25 kg.

In addition it should be remarked in connection with the above described example that a knitting process is preferably employed, wherein the pre-stretched small foil strips are knitted to form a coarse warp-knitted fabric of approximately 20 to 80 loops per 10 cm, preferably between 25 to 35 loops per 10 cm.

EXAMPLE 2

Foils of a thickness of 80 $\mu$m are produced from the material BIOFLEX BF 102. The foil wae produced on an extruder suitable for this, namely at a blow ratio of 1:4. Cooled, moistened air was used, in particular moistened support and interior air, preferably with an interior air exchange. This moistened air gives additional moisture to the foil for the subsequent processing into small strips.

The wound foil is cut into strips of 5 mm in a separate installation. The strips are heated to approximately 32° C., stretched at a ratio of 1:5 and wound on separate spools. Preferably a relative room humidity of more than 30%, advantageously of 55%, should also be present during this operation because of the "dry starch portions". Warp beams are then produced from these small strips on so-called beaming or warping machines. These warp beams can also selectively be used on double-knit machines, but also on weaving machines.

The small shoot strips are made from a foil of 50 $\mu$m thickness at a width of 1 mm. The small shot foil strips are dyed with a natural dye (beta carotene), so that they have an orange-red color.

A woven web is woven on a small strip weaving machine from the material in a manner known per se and used as the basic material for employment in 50 kg sacks for onions.

EXAMPLE 3

A double-knit or woven sack in accordance with Examples 1 or 2 is used to receive compostable garbage. The filled sacks are introduced into a composting installation, in which in an environment enriched with compost bacteria decomposition takes place within 2 to 4 weeks. The decomposition process depends on the system of the composting installation.

EXAMPLE 4

A double-knit sack produced in accordance with the process of claim 1 is provided with a woven band printed in colors suitable and acceptable for composting.

Products of various tensile strengths can be found in the previously mentioned DE-C-4 228 016. The foil can be produced by profile extrusion as well as by slit extrusion.

In principle the produced woven and knit material is of course also suitable for applications where only little tensile strength is required, for example for Christmas tree nets, vision screens, nets for protection from birds, and other nets which can be used in agriculture, wherein control decomposition is desired. Among these are, for example, pallet winding nets and so-called round bale nets for straw bales.

But the production of high-strength sacks is considerably more demanding than that of webs or nets where strength only has a subordinate role, such as tennis screens or other sheathing which can be produced in accordance with the same method.

What is claimed is:

1. A method for producing biodegradable woven or knit webs or mesh hoses from a foil material comprising a modified starch and having a softening point between about 60° C. and about 80° C., wherein said foil material has a thickness of between about 10 μm and about 350 μm, and wherein said method comprises the following steps:

subjecting said foil material to a relative humidity between 45% and 65%;

slitting said foil material into small foil strips;

stretching said small foil strips while heating said strips to a temperature between about 30° C. to about 70° C., at a stretching ratio between about 1:3 to about 1:10, and at a relative humidity between about 45% and about 65%;

cooling said stretched small foil strips to room temperature; and processing said cooled stretched small foil strips into a woven or knit web or mesh hose.

2. A method according to claim 1, wherein said foil is treated at a relative humidity of 50% to 60% prior to slitting said foil.

3. A method according to claim 1, wherein said stretching of said small foil strips occurs while heating to a temperature of about 35° C.±3° C., at a stretching ratio of about 1:4.5 to about 1:6.5, and at a relative humidity between about 50% and about 60%.

4. The method according to claim 1, wherein said processing step comprises knitting said cooled stretched small foil strips into a coarse warp-knitted fabric with about 20 to about 80 loops per 10 cm.

5. A method according to claim 4, wherein said coarse warp-knitted fabric has between about 20 to about 35 loops per 10 cm.

6. A method according to claim 1, wherein said processing step comprises knitting said cooled stretched small foil strips into a mesh hose with a thread number of about 70 to about 110 threads per hose circumference.

7. A method according to claim 1, wherein said processing step comprises knitting said cooled stretched small foil strips into a double-knit sack, wherein said cooled stretched small foil strips are knitted to form a coarse warp-knitted fabric with about 15 to about 50 loops per 10 cm.

8. A method according to claim 7, wherein said coarse warp-knitted fabric has about 20 to about 35 loops per 10 cm.

* * * * *

UNITED STATES PATENT AND TRADEMARK OFFICE
CERTIFICATE OF CORRECTION

PATENT NO. : 5,852,941
DATED : December 29, 1998
INVENTOR(S) : WURR

It is certified that error appears in the above-identified patent and that said Letters Patent is hereby corrected as shown below:

ON THE TITLE PAGE,

Please delete "[22] Filed Mar. 26, 1997" and insert therefor

-- [22] PCT Filed: April 11, 1996

[86] PCT No.: PCT/EP96/01550

§ 371 Date: Mar. 26, 1997

§ 102(e) Date: Mar. 26, 1997--

Signed and Sealed this

Third Day of August, 1999

Attest:

Q. TODD DICKINSON

*Attesting Officer*　　　*Acting Commissioner of Patents and Trademarks*